(12) United States Patent
Huh et al.

(10) Patent No.: US 10,059,187 B2
(45) Date of Patent: Aug. 28, 2018

(54) POWER TRAIN SYSTEM FOR HYBRID ELECTRIC VEHICLE

(71) Applicant: HYUNDAI MOTOR COMPANY, Seoul (KR)

(72) Inventors: Jun Hoi Huh, Seoul (KR); Seong Eun Park, Gwangmyeong-si (KR); Kwang Min Choi, Seoul (KR); Tae Sic Park, Busan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 350 days.

(21) Appl. No.: 14/963,015

(22) Filed: Dec. 8, 2015

(65) Prior Publication Data
US 2017/0072781 A1 Mar. 16, 2017

(30) Foreign Application Priority Data
Sep. 16, 2015 (KR) .......................... 10-2015-0130707

(51) Int. Cl.
| | |
|---|---|
| *F16H 37/04* | (2006.01) |
| *B60K 6/44* | (2007.10) |
| *B60K 6/442* | (2007.10) |
| *B60K 6/36* | (2007.10) |
| *B60K 6/387* | (2007.10) |
| *B60K 6/547* | (2007.10) |

(Continued)

(52) U.S. Cl.
CPC ............... *B60K 6/442* (2013.01); *B60K 6/36* (2013.01); *B60K 6/387* (2013.01); *B60K 6/547* (2013.01); *B60L 11/123* (2013.01); *B60L 11/14* (2013.01); *B60L 11/1809* (2013.01); *F16H 3/38* (2013.01); *B60Y 2200/92* (2013.01); *B60Y 2400/70* (2013.01); *Y10S 903/909* (2013.01); *Y10S 903/914* (2013.01); *Y10S 903/919* (2013.01)

(58) Field of Classification Search
CPC ... B60K 6/48; B60K 2006/4825; F16H 3/089; F16H 59/02
USPC ........................ 74/661, 665 A, 665 D, 665 E
See application file for complete search history.

(56) References Cited

U.S. PATENT DOCUMENTS

| | | | |
|---|---|---|---|
| 9,061,679 B2* | 6/2015 | Maruyama | ............. B60K 6/442 |
| 9,340,100 B2* | 5/2016 | Park | ......................... B60K 6/36 |

(Continued)

FOREIGN PATENT DOCUMENTS

| | | |
|---|---|---|
| JP | 2002-114048 A | 4/2002 |
| JP | 2005-297786 A | 10/2005 |

(Continued)

*Primary Examiner* — Ha Dinh Ho
(74) *Attorney, Agent, or Firm* — McDermott Will & Emery LLP

(57) ABSTRACT

A power train system for a hybrid electric vehicle includes an engine; a first motor operating as a motor for driving the vehicle; a first power transmission mechanism connected between the engine and the first motor; a second power transmission mechanism connected between the first motor and a driving shaft of traveling wheels and transmitting engine power transmitted to the first motor or the engine power and power from the first motor to the driving shaft of the traveling wheels; and a second motor connected to the second power transmission mechanism by a fourth power transmission mechanism to transmit power to the second power transmission mechanism and outputting power for driving the vehicle.

19 Claims, 9 Drawing Sheets

(51) Int. Cl.
   *B60L 11/12*   (2006.01)
   *B60L 11/14*   (2006.01)
   *B60L 11/18*   (2006.01)
   *F16H 3/38*    (2006.01)

(56) References Cited

U.S. PATENT DOCUMENTS

| | | | | |
|---|---|---|---|---|
| 2002/0189397 A1* | 12/2002 | Sakamoto | ................ | B60K 6/38 |
| | | | | 74/661 |
| 2011/0233020 A1* | 9/2011 | Tajima | ................... | B60K 6/387 |
| | | | | 192/48.8 |
| 2014/0051546 A1* | 2/2014 | Maruyama | ............. | B60K 6/442 |
| | | | | 477/5 |

FOREIGN PATENT DOCUMENTS

| | | | |
|---|---|---|---|
| JP | 2005-329841 A | | 12/2005 |
| JP | 2007-290677 A | | 11/2007 |
| JP | 2011-093494 A | | 5/2011 |
| KR | 10-1459474 B1 | | 11/2014 |
| KR | 10-1459490 B1 | | 11/2014 |
| KR | 10-2015-0020405 A | | 2/2015 |
| KR | 10-2015-0059702 A | | 6/2015 |
| KR | 10-2015-0074437 A | | 7/2015 |

* cited by examiner

POWER TRAIN SYSTEM FOR HYBRID ELECTRIC VEHICLE

CROSS-REFERENCE TO RELATED APPLICATION

This application claims under 35 U.S.C. § 119 a the benefit of priority to Korean Patent Application No. 10-2015-0130707 filed on Sep. 16, 2015, the entire content of which is incorporated herein by reference.

TECHNICAL FIELD

The present disclosure relates to a power train system for a hybrid electric vehicle. More particularly, the present disclosure relates to a power train system for a hybrid electric vehicle, which is capable of improving traveling efficiency when the vehicle travels in an electric vehicle (EV) mode and a parallel mode, and improving power transmission configurations.

BACKGROUND

Among environmentally-friendly vehicles, a hybrid electric vehicle (HEV) is provided with an engine using fuel and a motor using battery power for generating power used for driving the vehicle, and travels in an electric vehicle (EV) mode in which only motor power is transmitted to driving wheels or in a hybrid electric vehicle (HEV) mode in which the combination of engine power and motor power is transmitted to the driving wheels in a parallel mode.

In addition to the engine and the motor (hereinafter, referred to as a 'second motor') for driving the vehicle, a motor (hereinafter, referred to as a 'first motor') for generating electric power, which produces electrical energy by being supplied with power from the engine, is additionally provided. Thus, when a state of charge (SOC), which represents a charge amount of the battery, decreases to a predetermined level or lower, the first motor is operated by engine power so as to generate electric power for charging the battery, and the second motor is operated by battery power so as to allow the vehicle to travel with the power from the second motor [series mode], thereby increasing a distance that the vehicle can travel.

A plug-in hybrid electric vehicle (PHEV) can charge the battery by using a commercial electric power source, and travels optionally in a charge depleting (CD) mode and in a charge sustaining (CS) mode in accordance with the SOC of the battery.

The CD mode means a section of the EV mode where the vehicle travels only by the second motor driven by the battery power, and since the SOC of the battery is sufficient and available electric power is high, the vehicle travels only by using power from the second motor in most sections except for a special situation.

The CS mode means a section where the vehicle travels with an appropriate combination of power from the engine and power from the second motor like in the HEV mode (parallel mode) after using a predetermined amount of the battery power, or a section where the vehicle travels with power from the second motor like in the series mode while allowing the first motor to generate electric power by using engine power and allowing the battery to be charged.

Since in the CS mode, the SOC of the battery is not sufficient and available electric power is relatively low, the vehicle travels with a combination of engine power and motor power, or travels with motor power while using engine power to generate electric power and then charging the battery, thereby improving fuel efficiency, increasing a distance that the vehicle can travel, and maintaining an appropriate SOC of the battery.

FIG. 10 is a view illustrating a state in which a plug-in hybrid electric vehicle (PHEV) travels in an EV mode, an engine 1 and a first motor (MG1) 2 for generating electric power are connected to each other so as to transmit power therebetween, and a second motor (MG2) 4 for driving the vehicle and a driving wheel are connected to each other so as to transmit power therebetween.

The first motor 2 and the second motor 4 are connected with a battery 6 via an inverter system 5 so as to charge and discharge the battery 6, and an engine clutch 3, which selectively transmits or shuts off engine power, is disposed at an output side of the engine 1.

As illustrated, when the vehicle travels in the EV mode, the second motor 4 is driven by electric power from the battery 6 in a state in which the engine clutch 3 is disengaged, thereby allowing the vehicle to travel only with power from the second motor.

When the vehicle travels in the series mode, the first motor 2 is operated by power from the engine 1 so as to generate electric power and charge the battery 6 in a state in which the engine clutch 3 is disengaged, and at the same time, the second motor 4 is driven by electric power from the battery 6, thereby allowing the vehicle to travel with power from the second motor.

When the vehicle travels in the parallel mode, power from the engine 1 and power from the second motor 4 are transmitted to the driving wheel 7 in a state in which the engine clutch 3 is engaged, thereby allowing the vehicle to travel.

However, the engine clutch 3 used for the system as illustrated in FIG. 10 has drawbacks in that production costs and material costs thereof are high, and a large amount of power loss occurs due to rotation of a clutch rotating element (a part that receives power from the second motor) at the output side even though the clutch rotating element is disengaged when the vehicle travels in the EV mode, which deteriorates traveling efficiency in the EV mode.

In the case of the system as illustrated in FIG. 10, the engine 1 has only one stationary gear stage, and thus, there is a limitation in the traveling efficiency in the parallel mode.

The above information disclosed in this Background section is only for enhancement of understanding the background of the invention, and therefore, it may contain information that does not form the prior art that is already known in this country to a person of ordinary skill in the art.

SUMMARY OF THE DISCLOSURE

The present disclosure has been made in an effort to solve the above-described problems associated with the prior art, and to provide a power train system for a hybrid electric vehicle, which is capable of improving traveling efficiency when the vehicle travels in an electric vehicle (EV) mode and a parallel mode, by omitting an engine clutch, using a low-loss and low-cost power engaging-disengaging means as an alternative, and improving a power transmission configuration.

According to an embodiment in the present disclosure, a power train system for a hybrid electric vehicle includes: an engine; a first motor which operates as a motor for driving the vehicle or operates as an electric generator by being supplied with engine power; a first power transmission mechanism which is configured between the engine and the first motor, and transmits the engine power to the first motor; a second power transmission mechanism which is configured between the first motor and a driving shaft of traveling wheels, and operates to transmit engine power transmitted to the first motor or the engine power and power from the first motor to the driving shaft of the traveling wheels, or operates to block power from being transmitted between the first motor and the driving shaft of the traveling wheels; and a second motor which is connected to the second power transmission mechanism by a third power transmission mechanism so as to transmit power to the second power transmission mechanism, and outputs power for driving the vehicle and transmits the power to the driving shaft of the traveling wheels through the third power transmission mechanism and the second power transmission mechanism.

The first power transmission mechanism may include: an engine side gear which is installed on an output shaft of the engine; a first intermediate gear which is installed on a first power transmission shaft and meshes with the engine side gear; a second intermediate gear which is installed on the first power transmission shaft coaxially with the first intermediate gear; and a power transmission gear for the first motor which is installed on a rotating shaft of the first motor and meshes with the second intermediate gear.

The second power transmission mechanism may include: a first synchronizer which is connected to a rotating shaft of the first motor; a first input gear which is connected to the rotating shaft of the first motor by the first synchronizer such that power transmission with the rotating shaft of the first motor is selectively engaged or disengaged by an operation of the first synchronizer; a second input gear which is installed on the second power transmission shaft coaxially with the first input gear; an output gear which is installed on a third power transmission shaft, and connected to the driving shaft of the traveling wheels so as to transmit power to the driving shaft; and a fourth power transmission mechanism which is disposed between the first input gear, the second input gear, and the third power transmission shaft, and operates to transmit any one rotational force, which is selected from rotational force of the first input gear and the second input gear, to the third power transmission shaft.

The fourth power transmission mechanism may include: a first transmission gear which meshes with the first input gear; a second transmission gear which meshes with the second input gear; a second synchronizer which is operated to selectively engage or disengage power transmission between the first transmission gear and the third power transmission shaft; and a third synchronizer which is operated to selectively engage or disengage power transmission between the second transmission gear and the third power transmission shaft.

A gear ratio between the first input gear and the first transmission gear and a gear ratio between the second input gear and the second transmission gear may be set to be different from each other, and as gear stages at which power transmission is carried out, a first stage at which power may be transmitted through the first input gear and the first transmission gear, and a second stage at which power is transmitted through the second input gear and the second transmission gear may be implemented.

The third power transmission mechanism may include: a driving gear which is installed on a rotating shaft of the second motor; and a third transmission gear which is installed on the third power transmission shaft coaxially with the output gear, and meshes with the driving gear.

According to another embodiment in the present disclosure, a power train system for a hybrid electric vehicle, the power train system including: an engine; a first motor which operates as a motor for driving the vehicle or operates as an electric generator by being supplied with engine power; a first power transmission mechanism which is configured between the engine and the first motor, and transmits the engine power to the first motor; a second power transmission mechanism which is configured between the first motor and a driving shaft of a first traveling wheel, and operates to transmit engine power transmitted to the first motor or the engine power and power from the first motor to the driving shaft of the first traveling wheel, or operates to block power from being transmitted between the first motor and the driving shaft of the first traveling wheel; and a second motor which is connected to a driving shaft of a second traveling wheel so as to transmit power to the driving shaft of the second traveling wheel.

According to the power train system for a hybrid electric vehicle, low-loss and low-cost synchronizers are used as alternatives instead of the engine clutch, and the power transmission configuration is improved so as to implement a plurality of gear stages that may be selectively used for engine power transmission, and as a result, it is possible to improve traveling efficiency when the vehicle travels in the EV mode and the parallel mode, and it is possible to reduce material costs and production costs in comparison with the case in which the existing engine clutch is used.

In the power train system according to the present disclosure, more various modes are implemented by a configuration in which an engine and one motor may be used to drive the vehicle and by a further configuration in which the engine and two motors may be simultaneously used to drive the vehicle, in a parallel mode as well as the EV mode and the series mode.

The present disclosure may implement a 4 wheel-drive (4WD) system by simply changing a structure, and may cope with a need for the 4WD system for the hybrid electric vehicle.

Other aspects and embodiments of the invention are discussed infra.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles, e.g., fuel derived from resources other than petroleum. As referred to herein, a hybrid vehicle is a vehicle that has two or more sources of power, for example, both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present invention, and wherein.

Figure 1:
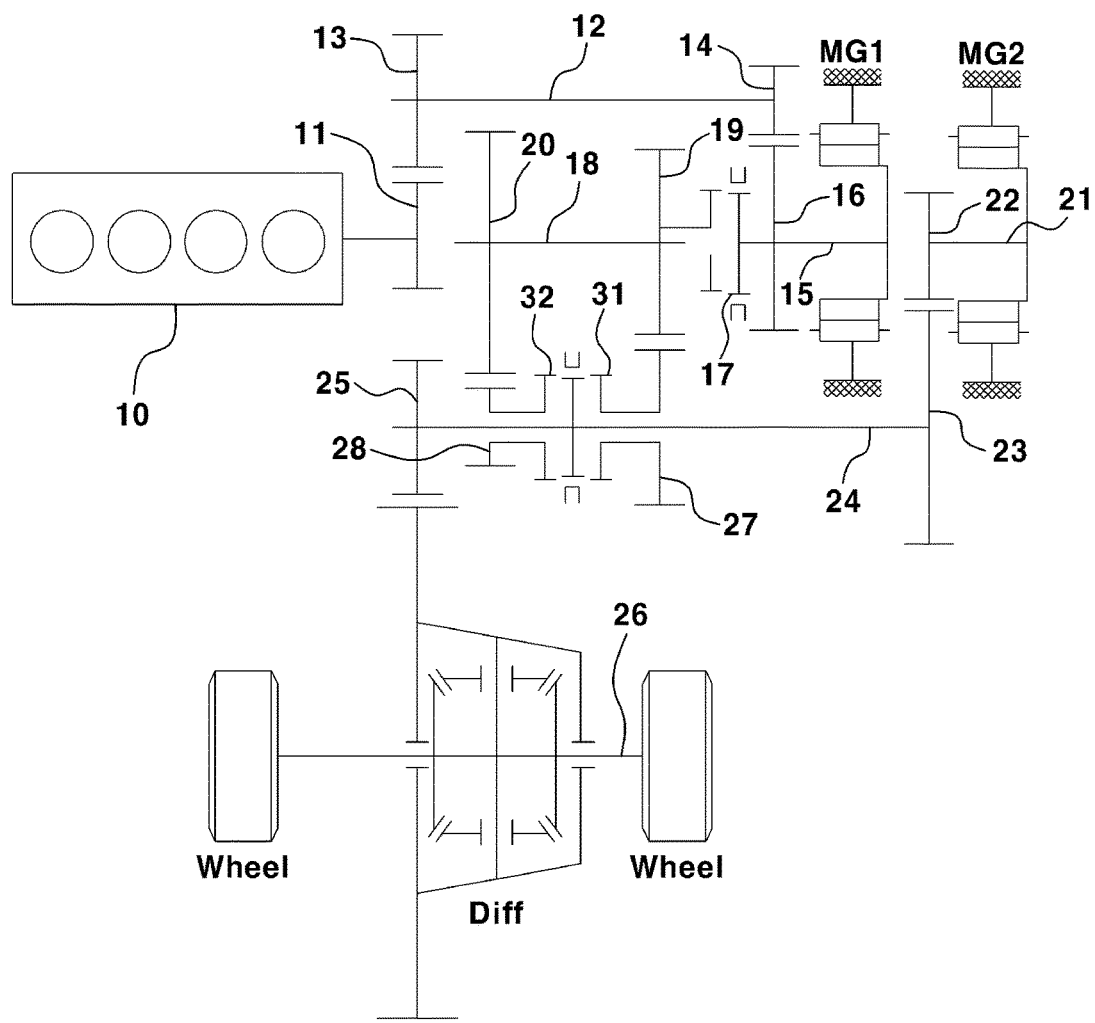
FIG. 1 is a power transmission system diagram illustrating a power train system for a hybrid electric vehicle according to a first exemplary embodiment in the present disclosure.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

Hereinafter, exemplary embodiments in the present disclosure will be described in detail with reference to the accompanying drawings so that those skilled in the art to which the present disclosure pertains may easily carry out the exemplary embodiments.

A main object of the present inventive concept is to provide a power train system for a hybrid electric vehicle, which is capable of improving traveling efficiency when the vehicle travels in an electric vehicle (EV) mode and a parallel mode.

The present disclosure employs synchronizers as power engaging-disengaging means that may have a lower power loss than an engine clutch and may reduce material costs and production costs, and the present disclosure improves a configuration so that a plurality of engine gear stages may be used.

In the power train system according to the present disclosure, more various modes are implemented by a configuration in which an engine and one motor may be used to drive the vehicle and by a further configuration in which the engine and two motors may be simultaneously used to drive the vehicle, in a parallel mode (HEV mode) as well as the EV mode and the series mode.

The present disclosure provides a power train system for a hybrid electric vehicle, which is capable of implementing a 4 wheel-drive (4WD) system by simply changing a structure.

First Exemplary Embodiment

FIG. 1 is a power transmission system diagram illustrating a power train system for a hybrid electric vehicle according to a first exemplary embodiment in the present disclosure.

The first exemplary embodiment is to provide a power train system that includes an engine 10, a first motor MG1, and a second motor MG2, and the engine 10 provides only power used to generate electric power for charging a battery (not illustrated) that is an energy storage device in the vehicle, or serves as a driving source which supplements output of the second motor MG2 so as to drive the vehicle.

When power from the engine 10 is used to supplement output of the second motor MG2, the power from the engine 10 is divided into power to be used to generate electric power and power to be transmitted to traveling wheels, such that the power from the engine 10 generates electric power and drive the vehicle at the same time.

Otherwise, power from the engine 10, together with power from the first motor MG1, may be transmitted to the traveling wheels, and as a result, the engine 10 and the first motor MG1 may supplement output of the second motor MG2 in order to drive the vehicle at the same time.

As described above, the first motor MG1 is operated as an electric generator by being supplied with power from the engine 10 so as to charge the battery, or serves as a power source (an auxiliary driving source for driving the vehicle) which is operated as a motor and supplements output of the second motor MG2.

In addition, the second motor MG2 serves as a main driving source for driving the vehicle, that is, a driving motor for outputting power used to drive the vehicle, and the second motor MG2 is configured such that power outputted from the second motor MG2 is finally transmitted to the traveling wheels (driving wheels of the vehicle).

The power train system according to the first exemplary embodiment has two paths through which engine power is transmitted to the traveling wheels, and the engine power is finally transmitted to the traveling wheels along one path selected from the two paths.

When describing the configuration, the engine 10 is connected to the first motor MG1 so as to be able to transmit power to the first motor MG1, and the second motor MG2 is connected to the path, through which power is applied from the first motor MG1 to the traveling wheels, so as to be able to transmit power.

A first power transmission mechanism, which transmits engine power to the first motor MG1, is disposed between the engine 10 and the first motor MG1, and the first power transmission mechanism has a configuration in which a plurality of gears are combined.

The first power transmission mechanism includes an engine side gear 11 which is installed on an output shaft of the engine 10, a first intermediate gear 13 which is installed on a first power transmission shaft 12 and meshes with the engine side gear 11, a second intermediate gear 14 which is installed on the first power transmission shaft 12 coaxially with the first intermediate gear 13, and a power transmission gear 16 for the first motor which is installed on a rotating shaft 15 of the first motor MG1 and meshes with the second intermediate gear 14.

A second power transmission mechanism, which transmits power from the first motor MG1 to a driving shaft 26 of the traveling wheels, is disposed between the first motor MG1 and the driving shaft 26 of the traveling wheels, and in a state in which the second power transmission mechanism is operated to transmit power, power from the first motor MG1 may be transmitted to the traveling wheels.

The second power transmission mechanism includes a first synchronizer 17 which is connected to the rotating shaft 15 of the first motor MG1, a first input gear 19 which is connected to the rotating shaft 15 of the first motor MG1 by the first synchronizer 17 such that power transmission with the rotating shaft 15 of the first motor MG1 is selectively engaged or disengaged by the first synchronizer 17, a second input gear 20 which is installed on a second power transmission shaft 18 coaxially with the first input gear 19, an output gear 25 which is installed on a third power transmission shaft 24 and connected with the driving shaft 26 of the traveling wheels so as to be able to transmit power to the driving shaft 26 of the traveling wheels, and a third power transmission mechanism which is disposed between the first input gear 19, the second input gear 20, and the third power transmission shaft 24 so as to transmit rotational force, which is transmitted from one gear selected from the first input gear 19 and the second input gear 20, to the third power transmission shaft 24.

The first synchronizer 17 synchronizes the rotating shaft 15 of the first motor MG1 and the first input gear 19, and serves as a device for selectively engaging-disengaging power transmission between the rotating shaft 15 of the first motor MG1 and the first input gear 19.

When the first synchronizer 17 is closed, power transmission is carried out through all of the rotating shaft 15 of the first motor MG1, the respective constituent elements of the first power transmission mechanism, the first input gear 19, and the second input gear 20.

The first synchronizer 17 serves as an engine clutch that selectively transmits power from the engine 10 so as to drive the vehicle, and the first synchronizer 17 is used as a power engaging-disengaging means that also selectively transmits power from the first motor MG1, which operates as a motor, to the traveling wheels.

The third power transmission mechanism includes a first transmission gear 27 which meshes with the first input gear 19, a second transmission gear 28 which meshes with the second input gear 20, a second synchronizer 31 which selectively engages or disengages power transmission between the first transmission gear 27 and the third power transmission shaft 24, and a third synchronizer 32 which selectively engages or disengages power transmission between the second transmission gear 28 and the third power transmission shaft 24.

Because all of the first synchronizer 17, the second synchronizer 31, and the third synchronizer 32 are publicly known configurations that engage or disengage power transmission between the constituent elements, and synchronize the constituent elements at both ends so that power transmission is enabled when the first synchronizer 17, the second synchronizer 31, and the third synchronizer 32 are closed, a detailed description thereof will be omitted.

In the present disclosure, closing and opening operations of the respective synchronizers may be set to be controlled based on a control signal from a controller in the vehicle, for example, a transmission control unit (TCU).

The first transmission gear 27 and the second transmission gear 28 are gears that are installed on the third power transmission shaft 24 so as to be able to idle. When the second synchronizer 31 is closed, rotational force of the first input gear 19 may be transmitted to the third power transmission shaft 24 through the first transmission gear 27 and the second synchronizer 31.

When the third synchronizer 32 is closed, rotational force of the second input gear 20 may be transmitted to the third power transmission shaft 24 through the second transmission gear 28 and the third synchronizer 32.

Here, the third power transmission shaft 24 is a shaft connected to the driving shaft 26 of the traveling wheels through the output gear 25 so that power transmission can be carried out at all times even in the second power transmission mechanism.

In a state in which the first synchronizer 17 is closed as described above, when power from the engine 10 is transmitted to the second power transmission shaft 18 or power from the engine 10 and power from the first motor MG1 are transmitted to the second power transmission shaft 18, the power, which has been transmitted to the second power transmission shaft 18, is then transmitted to the third power transmission shaft 24 through any one of the first input gear 19 and the second input gear 20.

That is, to transmit power from the engine 10 or transmit both power from the engine 10 and power from the first motor MG1 so that the power may be used to drive the vehicle, any one path is selected from the power transmission path including the first input gear 19 and the first transmission gear 27 and the power transmission path including the second input gear 20 and the second transmission gear 28. Thus, power, which has been transmitted to the second power transmission shaft 18, may be transmitted to the third power transmission shaft 24 through any one path selected from the two power transmission paths.

A path of the two power transmission paths, through which power is transmitted, is determined depending on operating states of the second synchronizer 31 and the third synchronizer 32 of the third power transmission mechanism.

In the case of the two power transmission paths, gear ratios of the power transmission gears, which form the respective paths, are set to be different from each other, and a gear ratio between the first input gear 19 and the first transmission gear 27 is different from a gear ratio between the second input gear 20 and the second transmission gear 28.

Therefore, when power from the engine 10 is transmitted to the traveling wheels so as to be used to drive the vehicle, any one gear stage may be selected as a gear stage for a transmission from a first stage having the gear ratio between the first input gear 19 and the first transmission gear 27, and a second stage having the gear ratio between the second input gear 20 and the second transmission gear 28.

In this case, the second synchronizer 31 and the third synchronizer 32 select the gear stage.

A rotating shaft 21 of the second motor MG2 is connected to the second power transmission mechanism by a fourth power transmission mechanism so as to be able to transmit power to the second power transmission mechanism, and the fourth power transmission mechanism includes a driving gear 22 which is installed on the rotating shaft 21 of the second motor MG2. A third transmission gear 23, which is installed on the third power transmission shaft 24 of the second power transmission mechanism, is connected coaxially with the output gear 25 of the second power transmission mechanism, and meshes with the driving gear 22.

Therefore, power from the second motor MG2 may be transmitted to the driving shaft 26 of the traveling wheels through the rotating shaft 21, the driving gear 22, the third transmission gear 23, the third power transmission shaft 24, and the output gear 25.

The power from the second motor MG2, which is transmitted as described above, is used as driving power for driving the vehicle.

The traveling wheel may be any one of a front wheel and a rear wheel of the vehicle, and the first exemplary embodiment in FIG. 1 shows a 2 wheel-drive (2WD) configuration in which the traveling wheels (front wheels or rear wheels) are operated as the driving wheels.

Hereinafter, an operating state and a power transmission flow for each mode in the power train system according to the first exemplary embodiment will be described below.

According to the power train system according to the first exemplary embodiment, there may be achieved an EV mode in which the second motor MG2 drives the vehicle, a series mode in which the first motor MG1 is operated as an electric generator by being supplied with power from the engine 10 so as to charge the battery and the second motor MG2 drives the vehicle. A first HEV mode and a second HEV mode which are parallel modes and in which the vehicle driving sources are used in a combined manner in order to drive the vehicle, and the vehicle may travel in any one mode of these traveling modes.

The first HEV mode is a hybrid mode in which the engine 10 and the second motor MG2 drive the vehicle, and the second HEV mode is a hybrid mode in which the engine 10, the first motor MG1, and the second motor MG2 drive the vehicle at the same time.

In the first HEV mode, a part of engine power drives the vehicle, and the remaining engine power is used to operate the first motor MG1 as an electric generator, As a result, in the first HEV mode, the battery is charged by the first motor MG1 that is operated as an electric generator.

The respective HEV mode is classified into a mode in which the first stage is selected as a gear stage, and a mode in which the second stage is selected as a gear stage, and therefore, any one mode may be selected from a total of four HEV modes.

EV Mode

Figure 2:
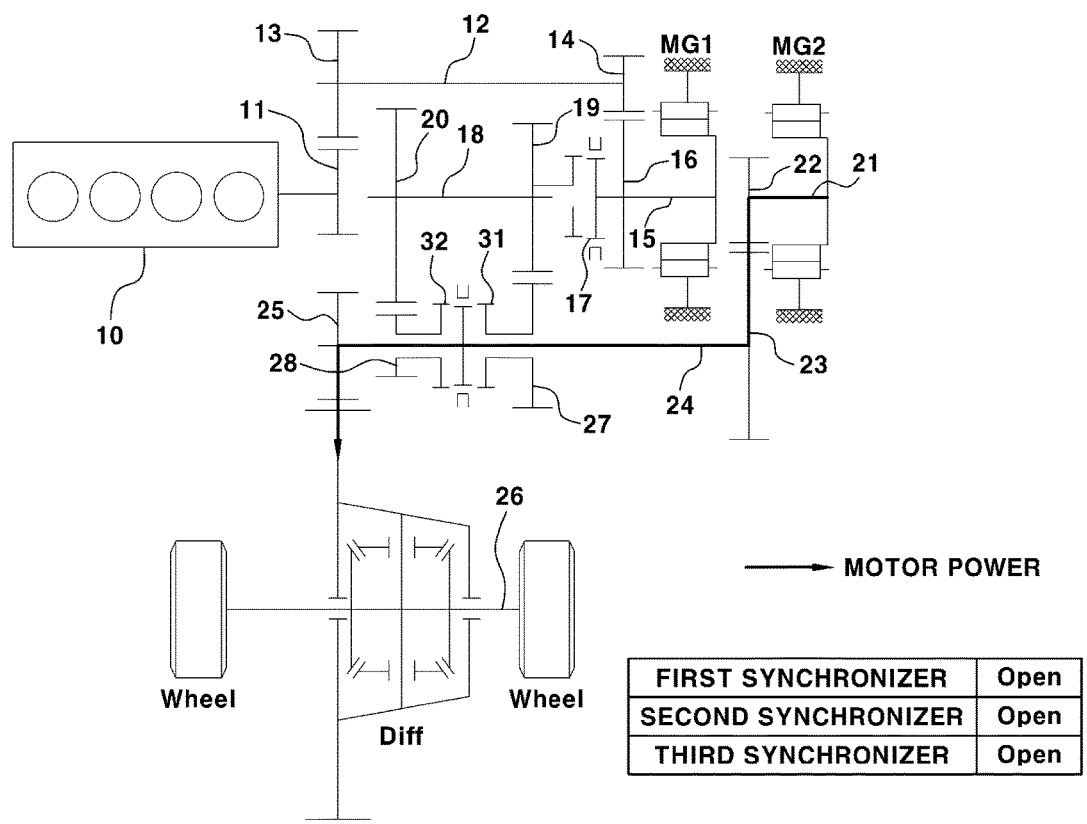
FIG. 2 is a view illustrating a power transmission flow when the power train system according to the first exemplary embodiment in the present disclosure is operated in an electric vehicle (EV) mode.

FIG. 2 illustrates a power transmission flow when the power train system according to the first exemplary embodiment in the present disclosure is operated in the EV mode.

The EV mode is an electric vehicle traveling mode (one motor is operated) in which the second motor MG2, which is a motor for driving the vehicle, is operated by consuming battery power in a state in which a state of charge (SOC, charge amount) of the battery is equal to or higher than a reference value and the vehicle travels with power from the second motor MG2, that is, the EV mode refers to a mode in which only the second motor MG2 is operated to drive the vehicle in a state in which the engine 10 and the first motor MG1 are not operated.

For this purpose, in an operating state in which power to the second power transmission mechanism is shut off, only the power from the second motor MG2 is finally transmitted to the driving shaft 26 of the traveling wheels through the fourth power transmission mechanism, the third power transmission shaft 24, and the output gear 25, thereby implementing the EV mode.

In the EV mode, all of the synchronizers 17, 31, and 32 of the second power transmission mechanism are opened, such that power from the second motor MG2 is transmitted to the driving shaft 26 of the traveling wheels through the rotating shaft 21, the driving gear 22 and the third transmission gear 23 of the fourth power transmission mechanism, the third power transmission shaft 24, and the output gear 25.

In the same manner, the reverse movement of the vehicle is achieved by operating the second motor MG2 in a reverse direction in a state in which all of the synchronizers 17, 31, and 32 are controlled to be opened. Here, the power transmission path is the same as that in the EV mode.

When the vehicle is braked or when the vehicle coasts, regenerative braking is implemented by transmitting rotational force of the traveling wheels to the second motor MG2 in a reverse direction in a state in which all of the synchronizers 17, 31, and 32 are opened, and in this case, the second motor MG2 operates as an electric generator and charges the battery.

Series Mode

Figure 3:
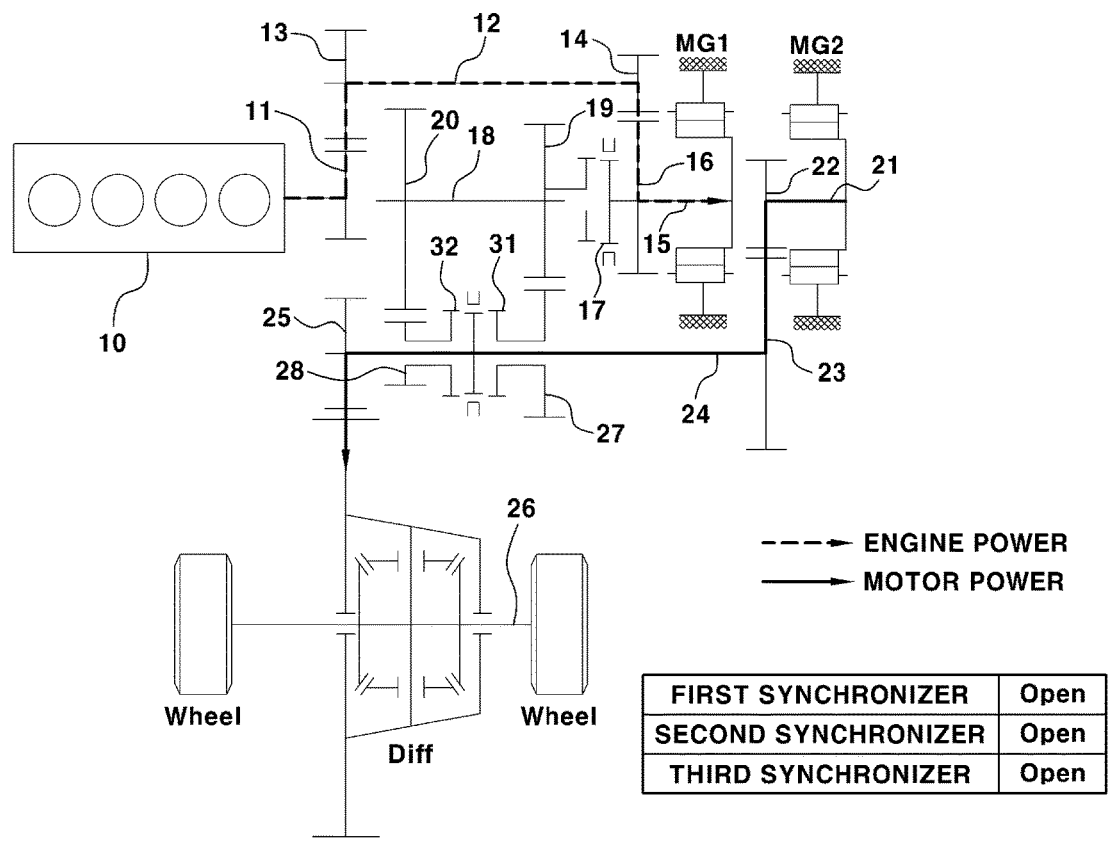
FIG. 3 is a view illustrating a power transmission flow when the power train system according to the first exemplary embodiment in the present disclosure is operated in a series mode.

FIG. 3 illustrates a power transmission flow when the power train system according to the first exemplary embodiment in the present disclosure is operated in the series mode.

The series mode refers to a mode in which when the SOC, which represents a charge amount of the battery, is decreased to a predetermined value or lower when the vehicle travels by the second motor MG2 that is a main driving source in the vehicle, the first motor MG1 is operated as an electric generator by power from the engine 10 and charges the battery, and the second motor MG2 is operated by being supplied with electric power from the battery charged by the first motor MG1, such that the vehicle travels.

In the series mode, in an operating state in which power to the second power transmission mechanism is shut off, power from the second motor MG2 is transmitted to the driving shaft 26 of the traveling wheels through the fourth power transmission mechanism, the third power transmission shaft 24, and the output gear 25. Simultaneously, the first motor MG1 is operated as an electric generator by power, which is transmitted from the engine 10 through the first power transmission mechanism, and charges the battery.

In detail, power from the second motor MG2 is transmitted to the driving shaft 26 of the traveling wheels through the rotating shaft 21, the driving gear 22 and the third transmission gear 23 of the fourth power transmission mechanism, the third power transmission shaft 24, and the output gear 25.

As all of the synchronizers 17, 31, and 32 of the second power transmission mechanism are opened, there is a power shut-off state in which power transmission is not carried out between the engine 10, the first motor MG1, and the third power transmission shaft 24.

However, power from the engine 10 is applied to the first motor MG1 through the engine side gear 11, the first intermediate gear 13, the first power transmission shaft 12, the second intermediate gear 14, the power transmission gear 16 for the first motor, and the rotating shaft 15, such that the first motor MG1 operates to generate electric power.

First HEV Mode—First Stage

Figure 4:
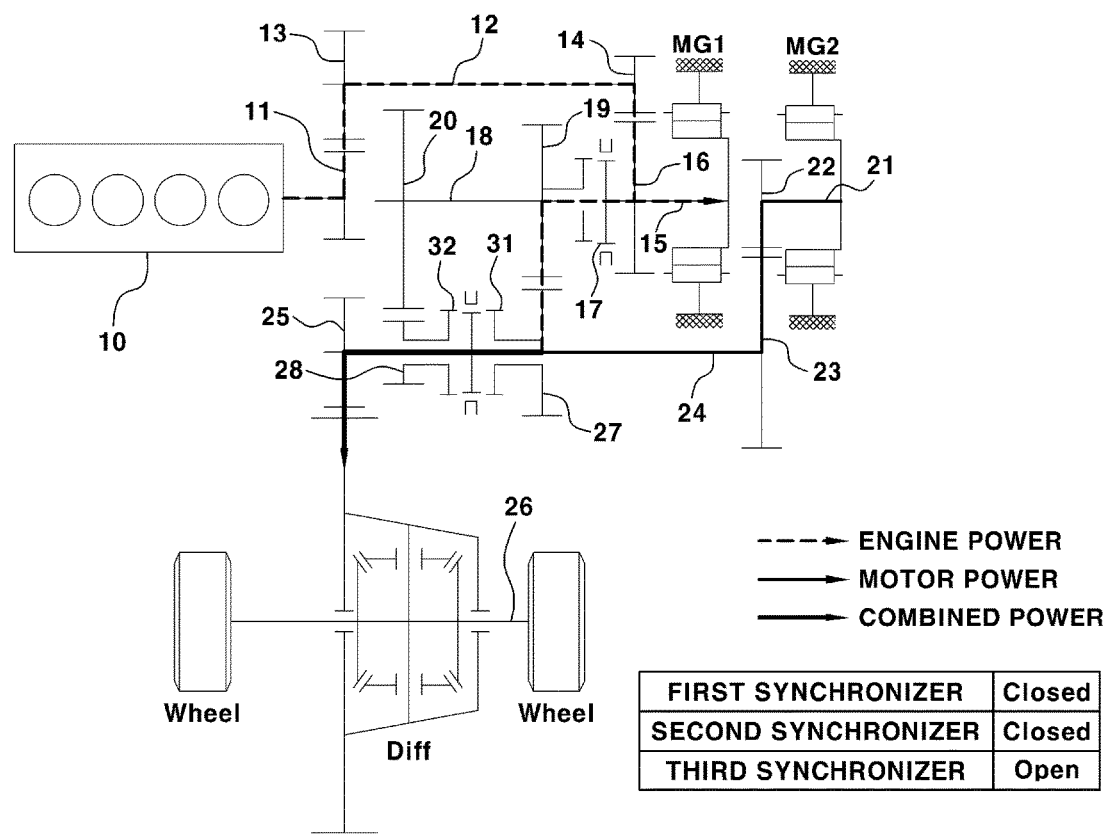
FIG. 4 is a view illustrating a power transmission flow when the power train system according to the first exemplary embodiment in the present disclosure is operated at a first stage in a first hybrid electric vehicle (HEV) mode.

FIG. 4 illustrates a power transmission flow when the power train system according to the first exemplary embodiment in the present disclosure is operated at the first stage in the first HEV mode.

The first HEV mode refers to a mode in which when power from the engine 10 is transmitted through the first power transmission mechanism, a part of the power is transmitted to the first motor MG1, and the remaining power is transmitted to the driving shaft 26 of the traveling wheels through the second power transmission mechanism together with power that is transmitted from the second motor MG2 through the fourth power transmission mechanism, such that the vehicle travels while power from the engine 10 supplements output of the second motor MG2.

That is, the first HEV mode refers to a mode in which the vehicle is driven by the engine 10 and the second motor MG2.

In the first HEV mode, as a distributed part of the power from the engine 10 is applied to the first motor MG1, the first motor MG1 operates as an electric generator, and the battery is charged by the first motor MG1.

The first stage is selected, such that power from the engine 10 is transmitted through the first input gear 19 of the second power transmission mechanism, and the first transmission gear 27.

In more detail, a part of engine power is transmitted to the first motor MG1 as power for generating electric power, and the remaining power is transmitted to the driving shaft 26 of the traveling wheels through the second power transmission mechanism as auxiliary power for driving the vehicle.

When the engine power is transmitted to the engine side gear 11, the first intermediate gear 13, the first power transmission shaft 12, the second intermediate gear 14, and the power transmission gear 16 for the first motor, a part of the engine power is applied to the first motor MG1 through the rotating shaft 15 and used when the first motor MG1 generates electric power.

The first synchronizer 17 and the second synchronizer 31 are in a closed state, and the third synchronizer 32 is in an opened state.

Therefore, the remaining power of the engine (not the power for generating electric power) is transmitted from the power transmission gear 16 for the first motor to the driving shaft 26 of the traveling wheels sequentially through the first synchronizer 17, the first input gear 19, the first transmission gear 27, the second synchronizer 31, the third power transmission shaft 24, and the output gear 25.

Power from the second motor MG2 is also transmitted to the third power transmission shaft 24 through the rotating shaft 21, and the driving gear 22 and the third transmission gear 23 of the fourth power transmission mechanism. The power from the engine 10 and the power from the second motor MG2 are combined and then transmitted to the driving shaft 26 of the traveling wheels.

First HEV Mode—Second Stage

Figure 5:
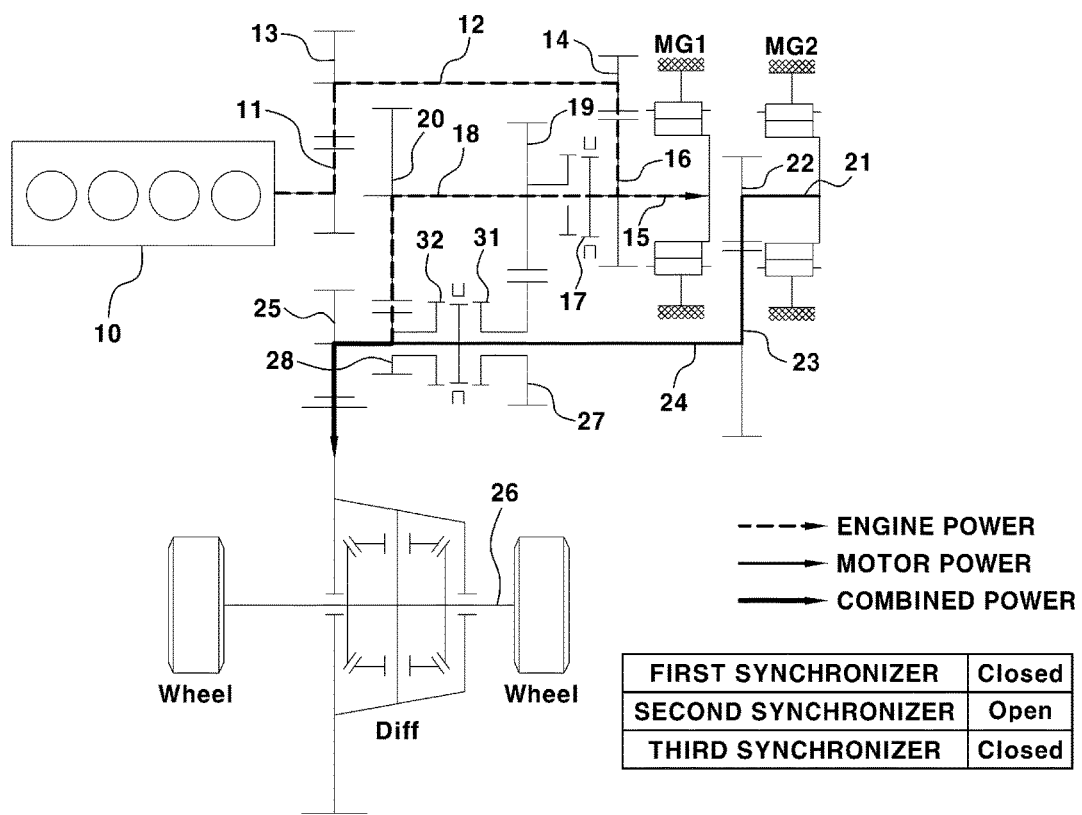
FIG. 5 is a view illustrating a power transmission flow when the power train system according to the first exemplary embodiment in the present disclosure is operated at a second stage in the first HEV mode.

FIG. 5 illustrates a power transmission flow when the power train system according to the first exemplary embodiment in the present disclosure is operated at the second stage in the first HEV mode.

In comparison with the operation at the first stage in the first HEV mode, the second stage is selected as a gear stage when the vehicle travels at the second stage, such that power from the engine 10 is transmitted through the second input gear 20 of the second power transmission mechanism and the second transmission gear 28.

In more detail, a part of engine power is transmitted to the first motor MG1 as power for generating electric power, and the remaining power is transmitted to the driving shaft 26 of the traveling wheels through the second power transmission mechanism as auxiliary power for driving the vehicle.

When the engine power is transmitted to the engine side gear 11, the first intermediate gear 13, the first power transmission shaft 12, the second intermediate gear 14, and the power transmission gear 16 for the first motor, a part of the engine power is applied to the first motor MG1 through the rotating shaft 15 and used when the first motor MG1 generates electric power.

The first synchronizer 17 and the third synchronizer 32 are controlled to be in a closed state, and the second synchronizer 31 is controlled to be in an opened state.

Therefore, the remaining power of the engine (not the power for generating electric power) is transmitted from the power transmission gear 16 for the first motor to the driving shaft 26 of the traveling wheels sequentially through the first synchronizer 17, the second power transmission shaft 18, the second input gear 20, the second transmission gear 28, the third synchronizer 32, the third power transmission shaft 24, and the output gear 25.

Power from the second motor MG2 is also transmitted to the third power transmission shaft 24 through the rotating shaft 21, and the driving gear 22 and the third transmission gear 23 of the fourth power transmission mechanism. The power from the engine 10 and the power from the second motor MG2 are combined and then transmitted to the driving shaft 26 of the traveling wheels.

Second HEV Mode—First Stage

Figure 6:
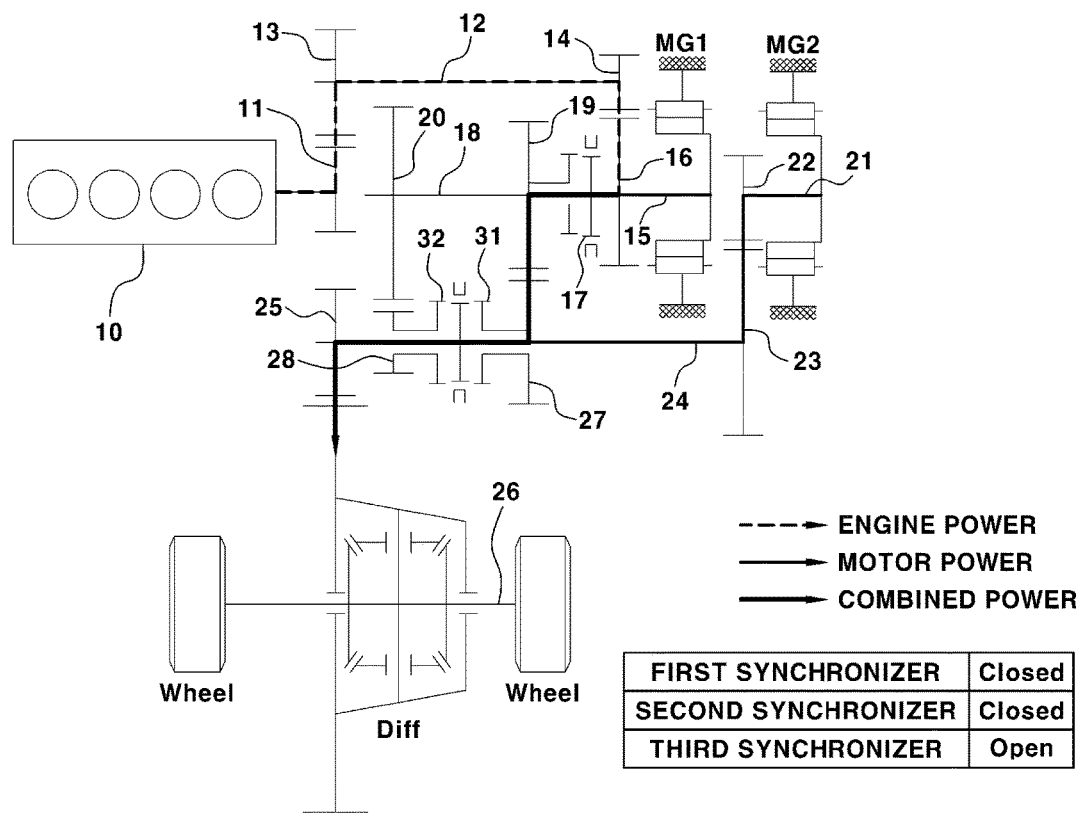
FIG. 6 is a view illustrating a power transmission flow when the power train system according to the first exemplary embodiment in the present disclosure is operated at a first stage in a second HEV mode.

FIG. 6 illustrates a power transmission flow when the power train system according to the first exemplary embodiment in the present disclosure is operated at the first stage in the second HEV mode.

The second HEV mode refers to a mode in which in a state in which the SOC, which represents a charge amount of the battery, is equal to or higher than a reference value (that may be identical to or different from the reference value in the EV mode and the series mode), power outputted from the engine 10 and the first motor MG1 is transmitted to the driving shaft 26 of the traveling wheels through the second power transmission mechanism together with the power that is transmitted from the second motor MG2 through the fourth power transmission mechanism, such that the vehicle travels while both the power from the engine 10 and the power from the first motor MG1 supplement output of the second motor MG2.

That is, in the second HEV mode, the first motor MG1 is also operated by consuming battery power (two motors are operated) similar to the second motor MG2, both power from the first motor MG1 and power from the second motor MG2 are used together with power from the engine 10 in order to drive the vehicle.

The first stage is selected, such that power from the engine 10 is transmitted through the first input gear 19 of the second power transmission mechanism, and the first transmission gear 27.

In detail, power outputted from the engine 10 is transmitted through the first power transmission mechanism, and power outputted from the first motor MG1 is combined with power from the engine 10, and then transmitted to the driving shaft 26 of the traveling wheels through the second power transmission mechanism.

The power from the engine 10 is transmitted to the engine side gear 11, the first intermediate gear 13, the first power transmission shaft 12, the second intermediate gear 14, and the power transmission gear 16 for the first motor, and power from the first motor MG1, which is outputted through the rotating shaft 15, is transmitted to the power transmission gear 16 for the first motor and then combined with power from the engine 10.

The first motor MG1 is operated to produce power instead of generating electric power, however, there is no difference in the power transmission operation of the second power transmission mechanism between the operating state at the first stage in the second HEV mode and the operating state at the first stage in the first HEV mode.

That is, the first synchronizer 17 and the second synchronizer 31 are controlled to be in a closed state, and the third synchronizer 32 is controlled to be in an opened state.

Therefore, power outputted from the engine 10 and the first motor MG1 is transmitted from the power transmission gear 16 for the first motor to the driving shaft 26 of the traveling wheels sequentially through the first synchronizer 17, the first input gear 19, the first transmission gear 27, the second synchronizer 31, the third power transmission shaft 24, and the output gear 25.

Power from the second motor MG2 is also transmitted to the third power transmission shaft 24 through the rotating shaft 21, and the driving gear 22 and the third transmission gear 23 of the fourth power transmission mechanism. The power from the engine 10 and the power from the second motor MG2 are combined and then transmitted to the driving shaft 26 of the traveling wheels.

Second HEV Mode—Second Stage

Figure 7:
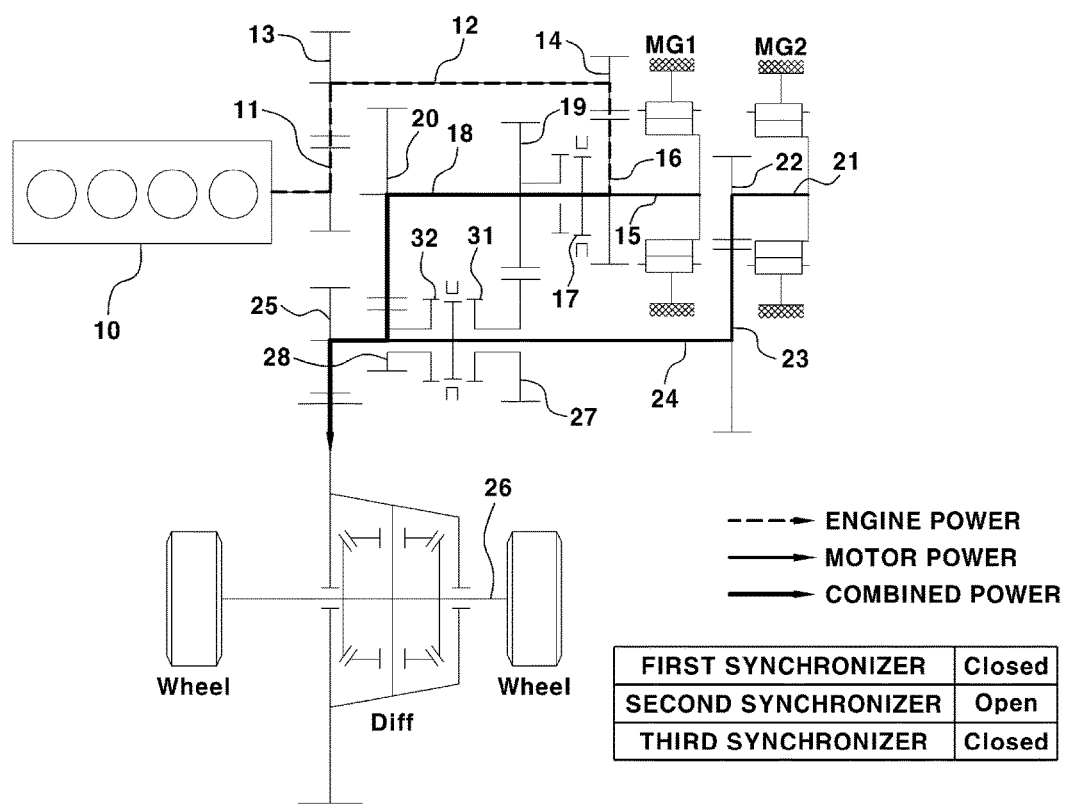
FIG. 7 is a view illustrating a power transmission flow when the power train system according to the first exemplary embodiment in the present disclosure is operated at a second stage in the second HEV mode.

FIG. 7 illustrates a power transmission flow when the power train system according to the first exemplary embodiment in the present disclosure is operated at the second stage in the second HEV mode.

In comparison with the operation at the first stage in the second HEV mode, the second stage is selected as a gear stage when the vehicle travels at the second stage, such that power from the engine 10 is transmitted through the second input gear 20 of the second power transmission mechanism and the second transmission gear 28.

In detail, power outputted from the engine 10 is transmitted through the first power transmission mechanism, and power outputted from the first motor MG1 is combined with power from the engine 10, and then transmitted to the driving shaft 26 of traveling wheels through the second power transmission mechanism.

The power from the engine 10 is transmitted to the engine side gear 11, the first intermediate gear 13, the first power transmission shaft 12, the second intermediate gear 14, and the power transmission gear 16 for the first motor. The power from the first motor MG1, which is outputted through the rotating shaft 15, is transmitted to the power transmission gear 16 for the first motor and then combined with power from the engine 10.

The first motor MG1 is operated to produce power instead of generating electric power, however, there is no difference in the power transmission operation of the second power transmission mechanism between the operating state at the second stage in the second HEV mode and the operating state at the second stage in the first HEV mode.

That is, the first synchronizer 17 and the third synchronizer 32 are controlled to be in a closed state, and the second synchronizer 31 is controlled to be in an opened state.

Therefore, the power outputted from the engine 10 and the first motor MG1 is transmitted from the power transmission gear 16 for the first motor to the driving shaft 26 of the traveling wheels sequentially through the first synchronizer 17, the second power transmission shaft 18, the second input gear 20, the second transmission gear 28, the third synchronizer 32, the third power transmission shaft 24, and the output gear 25.

The power from the second motor MG2 is also transmitted to the third power transmission shaft 24 through the rotating shaft 21, and the driving gear 22 and the third transmission gear 23 of the fourth power transmission mechanism. The power from the engine 10 and the power from the second motor MG2 are combined and then transmitted to the driving shaft 26 of the traveling wheels.

The respective traveling modes according to the first exemplary embodiment have been described above, and the operations of controlling the engine 10 and the respective motors MG1 and MG2 may be carried out under cooperative control of controllers (not illustrated) in the vehicle, for example, a hybrid control unit (HCU), an engine control unit (ECU), a motor control unit (MCU), a battery management system (BMS), or the like, similar to a typical hybrid electric vehicle.

The transmission control unit (TCU) may be set to control the operations of closing/opening the first, second, and third synchronizers 17, 31, and 32 based on a command of the hybrid control unit (HCU) that is a high level controller.

Figure 8:
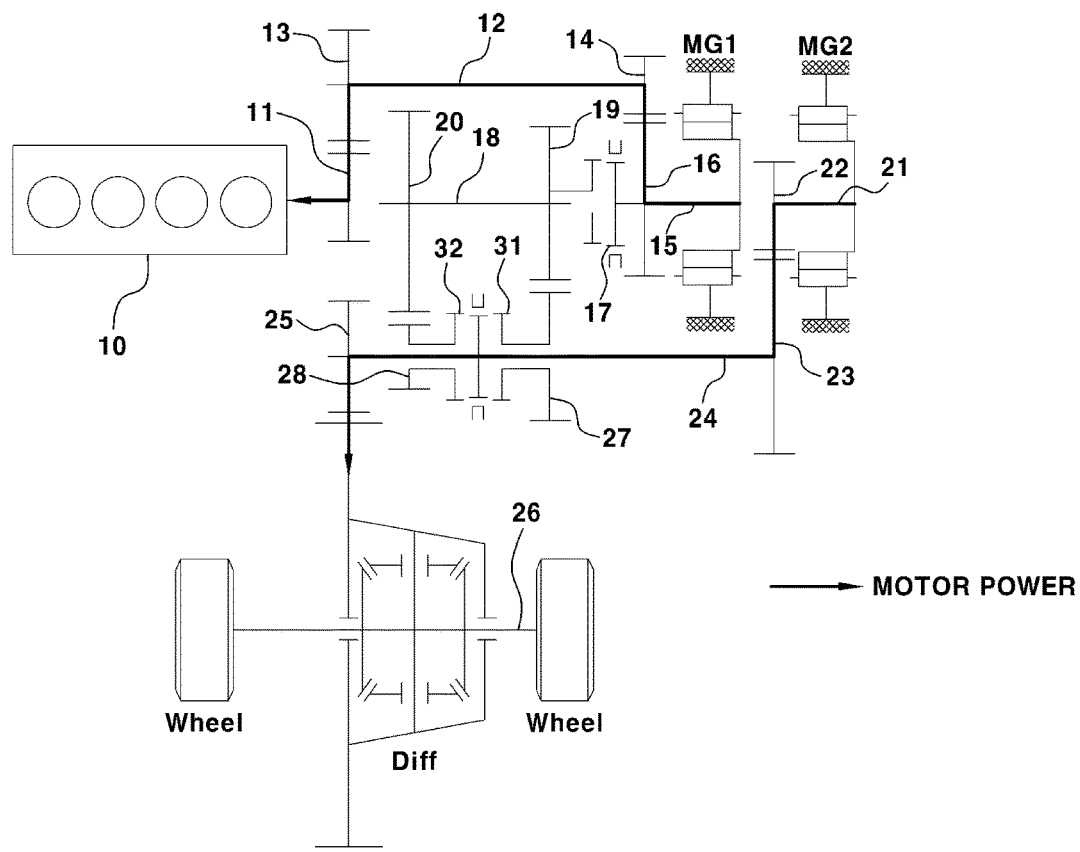
FIG. 8 is a view illustrating a state in which an engine speed is controlled by a first motor in order to change the mode in the power train system according to the first exemplary embodiment in the present disclosure.

FIG. 8 is a view illustrating a state in which an engine speed is controlled by the first motor in order to change the mode "from the EV mode to the HEV mode" in the power train system according to the first exemplary embodiment in the present disclosure.

As described above, all of the synchronizers 17, 31, and 32 are maintained in an opened state in the EV mode, and then in order to change the stage to the first stage in the first HEV mode or the first stage in the second HEV mode, the first synchronizer 17 and the second synchronizer 31 need to be controlled to be in a closed state.

The first motor MG1 is first operated to start the engine by transmitting power from the first motor MG1 to the engine 10 as illustrated in FIG. 8, and then an engine speed is controlled by the first motor MG1.

Thereafter, when the speeds of the engine 10 and the first motor MG1 are controlled to the speeds at which synchronization with the second motor MG2 is enabled, the first synchronizer 17 and the second synchronizer 31 are controlled to be closed.

All of the synchronizers 17, 31, and 32 are maintained in an opened state in the EV mode, and then in order to change the stage to the second stage in the first HEV mode or the second stage in the second HEV mode, the first synchronizer 17 and the third synchronizer 32 need to be controlled to be in a closed state.

In this case, the first motor MG1 starts the engine 10, and then the engine speed is controlled by the first motor MG1. When the speeds of the engine 10 and the first motor MG1 are controlled to the speeds at which synchronization with the second motor MG2 is enabled, the first synchronizer 17 and the third synchronizer 32 are controlled to be closed.

Second Exemplary Embodiment

Figure 9:
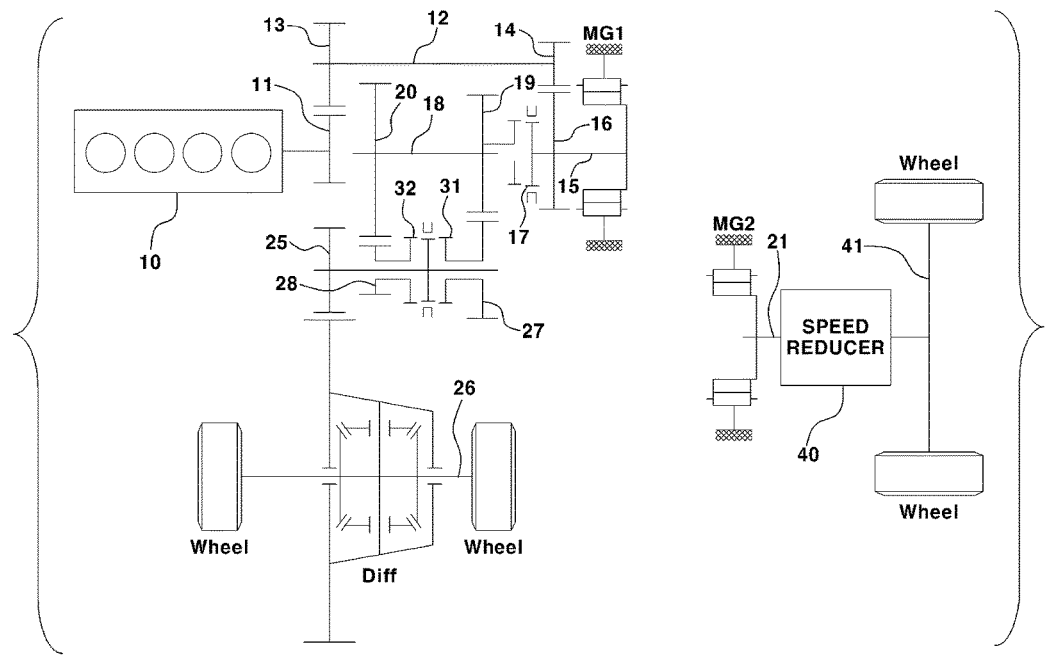
FIG. 9 is a power transmission system diagram illustrating a power train system for a hybrid electric vehicle according to a second exemplary embodiment in the present disclosure.
Figure 10:
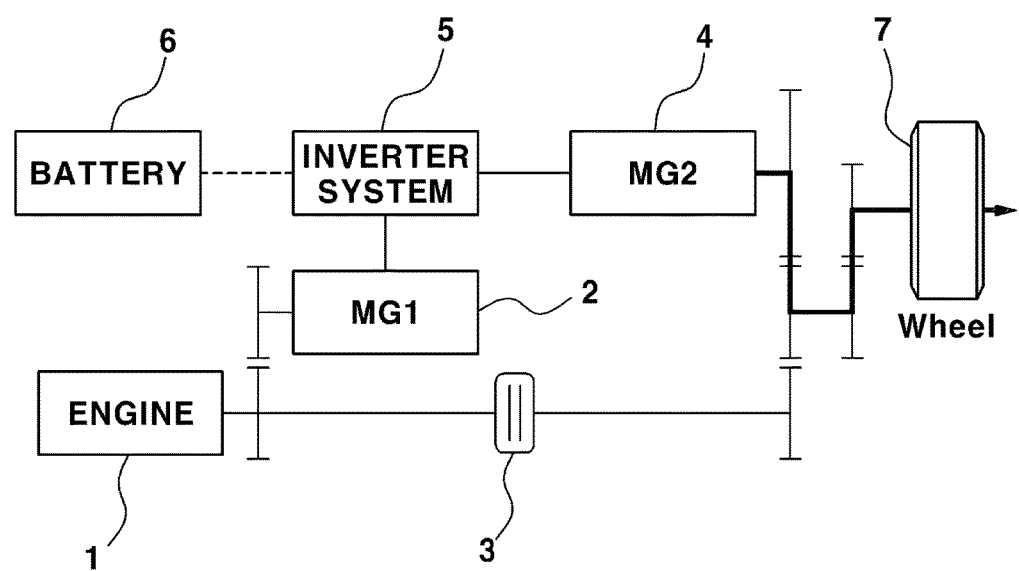
FIG. 10 is a view illustrating a state in which a plug-in hybrid electric vehicle (PHEV) in the related art travels in an EV mode.

FIG. 9 is a power transmission system diagram illustrating a power train system for a hybrid electric vehicle according to a second exemplary embodiment in the present disclosure.

While the first exemplary embodiment has shown the power train system for the two wheel drive (2WD) of a vehicle, the second exemplary embodiment shows a power train system for four wheel drive (4WD) of a vehicle.

That is, in a case in which a traveling wheel, which is operated by being supplied with power from the engine 10 or both power from the engine 10 and power from the first motor MG1, is a rear wheel when the power from the engine 10 or both the power from the engine 10 and the power from the first motor MG1 are transmitted to the driving shaft 26 of the traveling wheels in the hybrid electric vehicle (HEV) mode as power for driving the vehicle, power from the second motor MG2 is transmitted to the front wheel via a speed reducer 40, such that both the front wheel and the rear wheel may be used as driving wheels.

On the contrary, a traveling wheel to which the power from the engine 10 or both the power from the engine 10 and the power from the first motor MG1 are transmitted may be a front wheel, and in this case, the traveling wheel to which the power from the second motor MG2 is transmitted may be the rear wheel.

To allow the 4WD driving to be carried out, the rotating shaft 21 of the second motor MG2 is connected to the driving shaft 41 of the traveling wheels via the speed reducer 40 as illustrated in FIG. 9.

Referring to FIG. 9, the second motor MG2 is coupled to a driving shaft 41 of another traveling wheel at an independent position that is not connected with the engine 10 and the first motor MG1 so as to be able to transmit power to the traveling wheel.

Even in the second exemplary embodiment, a main driving source for driving the vehicle is the second motor MG2, and as a result, in the EV mode and the series mode, the second motor MG2 is operated such that the vehicle travels as power from the second motor MG2 is transmitted to the driving shaft 41 of the traveling wheels via the speed reducer 40.

As illustrated in FIG. 9, in comparison with the first exemplary embodiment as illustrated in FIG. 1, because there is no difference in constituent elements between the first exemplary embodiment and the second exemplary embodiment except that the second motor MG2 is connected to the traveling wheels, which are not connected to the first motor MG1, through the speed reducer 40 so as to transmit power to the traveling wheels, and the rotating shaft 21 of the second motor MG2 is not connected to the third power transmission shaft 24 so as not to transmit power to the third power transmission shaft 24. Thus, the fourth power transmission mechanism including the driving gear 22 and the third transmission gear 23 is omitted, a detailed description thereof will be omitted.

In the second exemplary embodiment, there are traveling modes such as the EV mode, the series mode, the first HEV mode (the first stage, and the second stage), and the second HEV mode (the first stage, and the second stage). There is also no difference in terms of the first exemplary embodiment and the second exemplary embodiment in terms of the operating state for each traveling mode, that is, the engine 10 and the first motor MG1 which may be used as driving sources for a vehicle, the second motor MG2 which is used as a main driving source, the first synchronizer 17 which serves as an engine clutch, and the operations of the second synchronizer 31 and the third synchronizer 32 for selecting a gear stage, and as a result, the above description may be used to describe the operating state for each mode.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A power train system for a hybrid electric vehicle, the power train system comprising:
    an engine;
    a first motor operating as a motor for driving the vehicle or operating as an electric generator by an engine power;
    a first power transmission mechanism connected between the engine and the first motor and transmitting the engine power to the first motor;
    a second power transmission mechanism connected between the first motor and a driving shaft of traveling wheels and transmitting the engine power transmitted to the first motor or the engine power and power from the first motor to the driving shaft of the traveling wheels, or blocking power from being transmitted between the first motor and the driving shaft of the traveling wheels; and
    a second motor connected to the second power transmission mechanism by a third power transmission mechanism to transmit power to the second power transmission mechanism, the second motor outputting power for driving the vehicle and transmitting the power to the driving shaft of the traveling wheels through the third power transmission mechanism and the second power transmission mechanism,
    wherein the first power transmission mechanism includes:
        an engine side gear installed on an output shaft of the engine;
        a first intermediate gear installed on a first power transmission shaft and meshed with the engine side gear;
        a second intermediate gear installed on the first power transmission shaft coaxially with the first intermediate gear; and
        a power transmission gear for the first motor installed on a rotating shaft of the first motor and meshed with the second intermediate gear.

2. The power train system of claim 1, wherein the second power transmission mechanism includes:
    a first synchronizer connected to a rotating shaft of the first motor;
    a first input gear connected to the rotating shaft of the first motor by the first synchronizer such that power transmission with the rotating shaft of the first motor is selectively engaged or disengaged by an operation of the first synchronizer;
    a second input gear installed on the second power transmission shaft coaxially with the first input gear;
    an output gear installed on a third power transmission shaft and connected to the driving shaft of the traveling wheels to transmit power to the driving shaft; and
    a fourth power transmission mechanism disposed between the first input gear, the second input gear, and the third power transmission shaft, and transmitting any one rotational force, which is selected from rotational force of the first input gear and the second input gear, to the third power transmission shaft.

3. The power train system of claim 2, wherein the fourth power transmission mechanism includes:
    a first transmission gear meshed with the first input gear;
    a second transmission gear meshed with the second input gear;

a second synchronizer selectively engaging or disengaging power transmission between the first transmission gear and the third power transmission shaft; and a third synchronizer selectively engaging or disengaging power transmission between the second transmission gear and the third power transmission shaft.

4. The power train system of claim 3, wherein a gear ratio between the first input gear and the first transmission gear and a gear ratio between the second input gear and the second transmission gear are different from each other, and wherein a first stage, at which power is transmitted through the first input gear and the first transmission gear, and a second stage, at which power is transmitted through the second input gear and the second transmission gear, are used as gear stages at which power transmission is carried out.

5. The power train system of claim 2, wherein the third power transmission mechanism includes:

a driving gear installed on a rotating shaft of the second motor; and a third transmission gear installed on the third power transmission shaft coaxially with the output gear and meshed with the driving gear.

6. The power train system of claim 1, wherein in an operating state in which power to the second power transmission mechanism is shut off, an electric vehicle (EV) mode, in which only power from the second motor is transmitted to the driving shaft of the traveling wheels through the third power transmission mechanism and a power transmission shaft of the second power transmission mechanism that is connected to the driving shaft of the traveling wheels at all times to transmit power to the driving shaft, is implemented.

7. The power train system of claim 1, wherein in an operating state in which power to the second power transmission mechanism is shut off, a series mode, in which the first motor is operated to generate electric power and a battery is charged by engine power transmitted to the first motor, and at the same time, only power from the second motor is transmitted to the driving shaft of the traveling wheels through a power transmission shaft of the second power transmission mechanism which is connected to the third power transmission mechanism and the driving shaft of the traveling wheels at all times to transmit power thereto, is implemented.

8. The power train system of claim 1, wherein in a power transmission operating state of the second power transmission mechanism, a hybrid electric vehicle (HEV) mode, in which engine power transmitted to the first motor is transmitted to the driving shaft of the traveling wheels through the second power transmission mechanism, and at the same time, power from the second motor is transmitted to the driving shaft of the traveling wheels through a power transmission shaft of the second power transmission mechanism which is connected to the third power transmission mechanism and the driving shaft of the traveling wheels at all times to transmit power thereto, is implemented.

9. The power train system of claim 8, wherein in the HEV mode, the first motor generates electric power such that a part of engine power transmitted to the first motor is used as power of the first motor, which generates electric power used to charge a battery, and the remaining engine power is transmitted to the driving shaft of the traveling wheels and used as power for driving the vehicle.

10. The power train system of claim 1, wherein in a power transmission operating state of the second power transmission mechanism, an HEV mode, in which engine power transmitted to the first motor and power from the first motor are transmitted to the driving shaft of the traveling wheels through the second power transmission mechanism, and at the same time, power from the second motor is transmitted to the driving shaft of the traveling wheels through the power transmission shaft of the second power transmission mechanism which is connected to the third power transmission mechanism and the driving shaft of the traveling wheels at all times to transmit power thereto, is implemented.

11. A power train system for a hybrid electric vehicle, the power train system comprising:

an engine;

a first motor operating as a motor for driving the vehicle or operating as an electric generator by engine power;

a first power transmission mechanism connected between the engine and the first motor and transmitting the engine power to the first motor;

a second power transmission mechanism connected between the first motor and a driving shaft of a first traveling wheel, the second power transmission mechanism transmitting engine power transmitted to the first motor or the engine power and power from the first motor to the driving shaft of the first traveling wheel or blocking power from being transmitted between the first motor and the driving shaft of the first traveling wheel; and a second motor connected to a driving shaft of a second traveling wheel so as to transmit power to the driving shaft of the second traveling wheel, wherein the first power transmission mechanism includes:

an engine side gear installed on an output shaft of the engine;

a first intermediate gear installed on a first power transmission shaft and meshed with the engine gear;

a second intermediate gear installed on the first power transmission shaft coaxially with the first intermediate gear; and a power transmission gear for the first motor installed on a rotating shaft of the first motor and meshed with the second intermediate gear.

12. The power train system of claim 11, wherein the first traveling wheel is a rear wheel or a front wheel that is one of the rear wheels and the front wheels of the vehicle, the second traveling wheel is the other front wheel or the other rear wheel that is the other one of the rear wheels and the front wheels of the vehicle, and the second motor is connected to the driving shaft of the second traveling wheel via a speed reducer.

13. The power train system of claim 11, wherein the second power transmission mechanism includes:

a first synchronizer connected to a rotating shaft of the first motor;

a first input gear which is connected to the rotating shaft of the first motor by the first synchronizer such that power transmission with the rotating shaft of the first motor is selectively engaged or disengaged by an operation of the first synchronizer;

a second input gear installed on the second power transmission shaft coaxially with the first input gear;

an output gear installed on a third power transmission shaft and connected to the driving shaft of the first traveling wheel to transmit power to the driving shaft; and a third power transmission mechanism disposed between the first input gear, the second input gear, and the third power transmission shaft, the third power transmission mechanism operating to transmit any one rotational force, which is selected from rotational force of the first input gear and the second input gear, to the third power transmission shaft.

14. The power train system of claim 13, wherein the third power transmission mechanism includes:
   a first transmission gear meshed with the first input gear;
   a second transmission gear meshed with the second input gear;
   a second synchronizer selectively engaging or disengaging power transmission between the first transmission gear and the third power transmission shaft; and
   a third synchronizer selectively engaging or disengaging power transmission between the second transmission gear and the third power transmission shaft.

15. The power train system of claim 14, wherein a gear ratio between the first input gear and the first transmission gear and a gear ratio between the second input gear and the second transmission gear are different from each other, and
   a first stage, at which power is transmitted through the first input gear and the first transmission gear, and a second stage, at which power is transmitted through the second input gear and the second transmission gear, are implemented as gear stages at which power transmission is carried out.

16. The power train system of claim 11, wherein in an operating state in which power to the second power transmission mechanism is shut off, a series mode, in which the first motor generates electric power and a battery is charged by engine power transmitted to the first motor, and at the same time, power from the second motor is transmitted to the driving shaft of the second traveling wheel and the second traveling wheel is used as a driving wheel, is implemented.

17. The power train system of claim 11, wherein in a power transmission operating state of the second power transmission mechanism, an HEV mode, in which engine power transmitted to the first motor is transmitted to the driving shaft of the first traveling wheel through the second power transmission mechanism, and at the same time, power from the second motor is transmitted to the driving shaft of the second traveling wheel, is implemented.

18. The power train system of claim 17, wherein in the HEV mode, the first motor generates electric power such that a part of engine power transmitted to the first motor is used as power of the first motor, which generates electric power used to charge the battery, and the remaining engine power is transmitted to the driving shaft of the first traveling wheel and used as power for driving the vehicle.

19. The power train system of claim 11, wherein in a power transmission operating state of the second power transmission mechanism, an HEV mode, in which engine power transmitted to the first motor and power from the first motor are transmitted to the driving shaft of the first traveling wheel through the second power transmission mechanism, and at the same time, power from the second motor is transmitted to the driving shaft of the second traveling wheel, is implemented.

* * * * *